(12) United States Patent
Hotokeishi

(10) Patent No.: US 7,599,077 B2
(45) Date of Patent: Oct. 6, 2009

(54) NETWORK PRINTING SYSTEM, NETWORK PRINTING DEVICE AND NETWORK PRINTING METHOD

(75) Inventor: Kennichiro Hotokeishi, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 676 days.

(21) Appl. No.: 10/521,558

(22) PCT Filed: Jul. 22, 2002

(86) PCT No.: PCT/JP02/07372

§ 371 (c)(1),
(2), (4) Date: Jan. 19, 2005

(87) PCT Pub. No.: WO2004/009361

PCT Pub. Date: Jan. 29, 2004

(65) Prior Publication Data

US 2006/0087676 A1    Apr. 27, 2006

(51) Int. Cl.
*G06F 3/12* (2006.01)
*H04N 1/393* (2006.01)

(52) U.S. Cl. .................. 358/1.13; 358/1.15; 358/1.18; 358/2.1; 358/451

(58) Field of Classification Search ......... 358/1.1–1.18, 358/2.1, 451, 452, 537
See application file for complete search history.

(56) References Cited

U.S. PATENT DOCUMENTS

| | | | | |
|---|---|---|---|---|
| 5,859,956 | A * | 1/1999 | Sugiyama et al. | 358/1.13 |
| 6,417,931 | B2 * | 7/2002 | Mori et al. | 358/1.15 |
| 6,633,400 | B1 * | 10/2003 | Sasaki et al. | 358/1.15 |
| 7,145,679 | B2 * | 12/2006 | Hitaka | 358/1.15 |
| 7,190,481 | B2 * | 3/2007 | Hirabayashi | 358/1.18 |
| 7,349,120 | B2 * | 3/2008 | Xia | 358/1.2 |

(Continued)

FOREIGN PATENT DOCUMENTS

JP    A-03-251481    11/1991

(Continued)

OTHER PUBLICATIONS

Kikuchi Yukiko, Page Printer Sharing System, Sep. 22, 2004, JP 06-266516- English Translation.*

(Continued)

*Primary Examiner*—Twyler L Haskins
*Assistant Examiner*—Dennis Dicker
(74) *Attorney, Agent, or Firm*—Oliff & Berridge, PLC

(57) ABSTRACT

A network printing system for conducting printing with a specified printing device among a plurality of printing devices connected to a network. In this system, a network device (1) is provided for converting print-request data sent from a print requester via the network into a format for the specified printing device to create print data, and transmitting the print data to the specified printing device via the network. The network device (1) includes: a device information storage section (14) for storing device information representing print specifications for the plurality of printing devices; a document definition file storage section (12) for storing a document definition file representing a definition of a document; and a format converting section (16) for converting the print-request data into the print format for the printing device based on the retrieved document definition file and the device information of the printing device.

13 Claims, 12 Drawing Sheets

U.S. PATENT DOCUMENTS

| | | | |
|---|---|---|---|
| 7,372,590 B2 * | 5/2008 | Kuroda | 358/1.15 |
| 2002/0063892 A1 * | 5/2002 | Tsukada | 358/1.15 |
| 2002/0186275 A1 * | 12/2002 | Usui | 347/43 |

FOREIGN PATENT DOCUMENTS

| | | |
|---|---|---|
| JP | A-06-149500 | 5/1994 |
| JP | A-06-149504 | 5/1994 |
| JP | A-06-266516 | 9/1994 |
| JP | A-08-234943 | 9/1996 |
| JP | A-2001-222155 | 8/2000 |
| JP | A-2001-277644 | 10/2001 |

OTHER PUBLICATIONS

JP 06-266516 English Translation.*

* cited by examiner

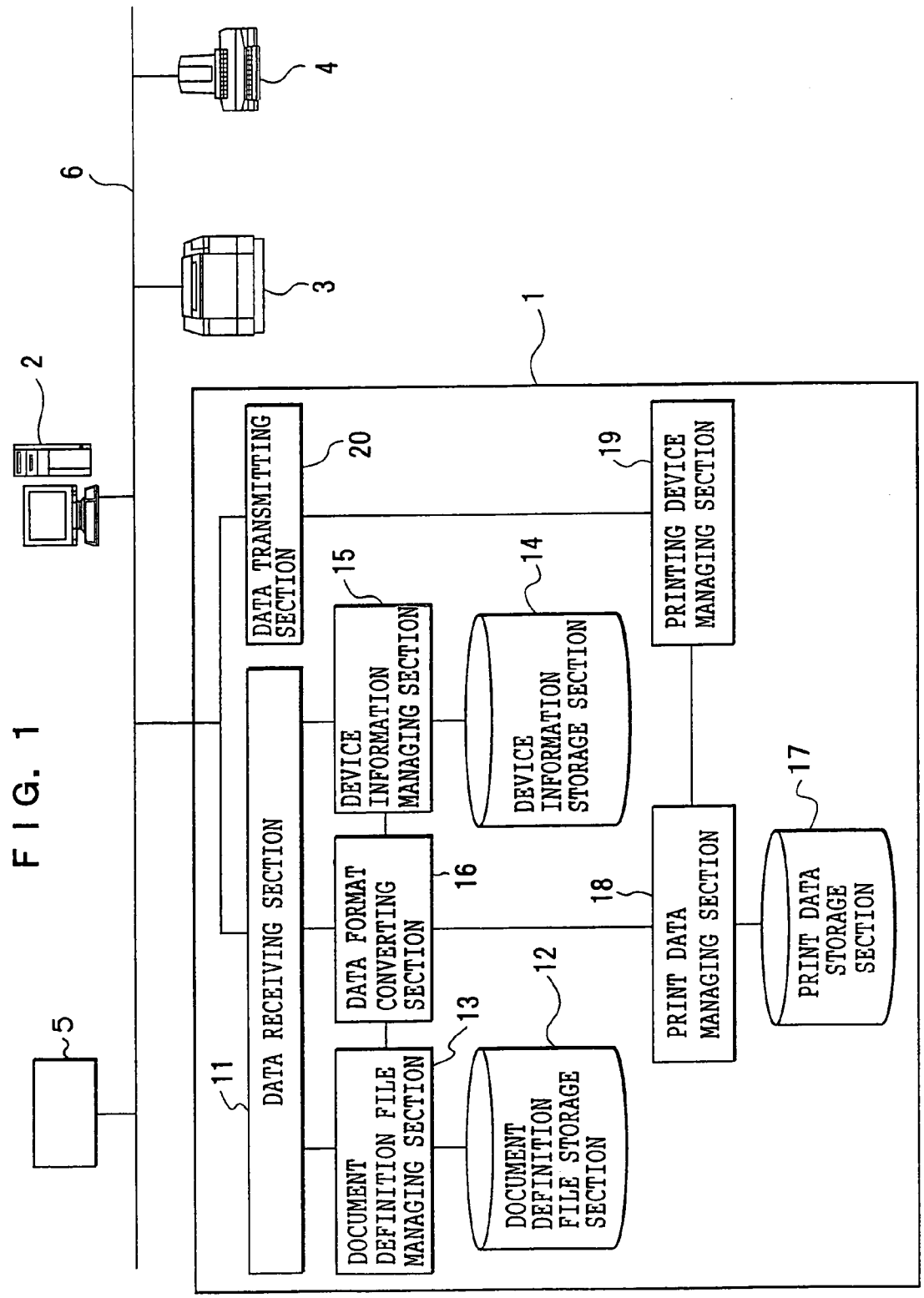

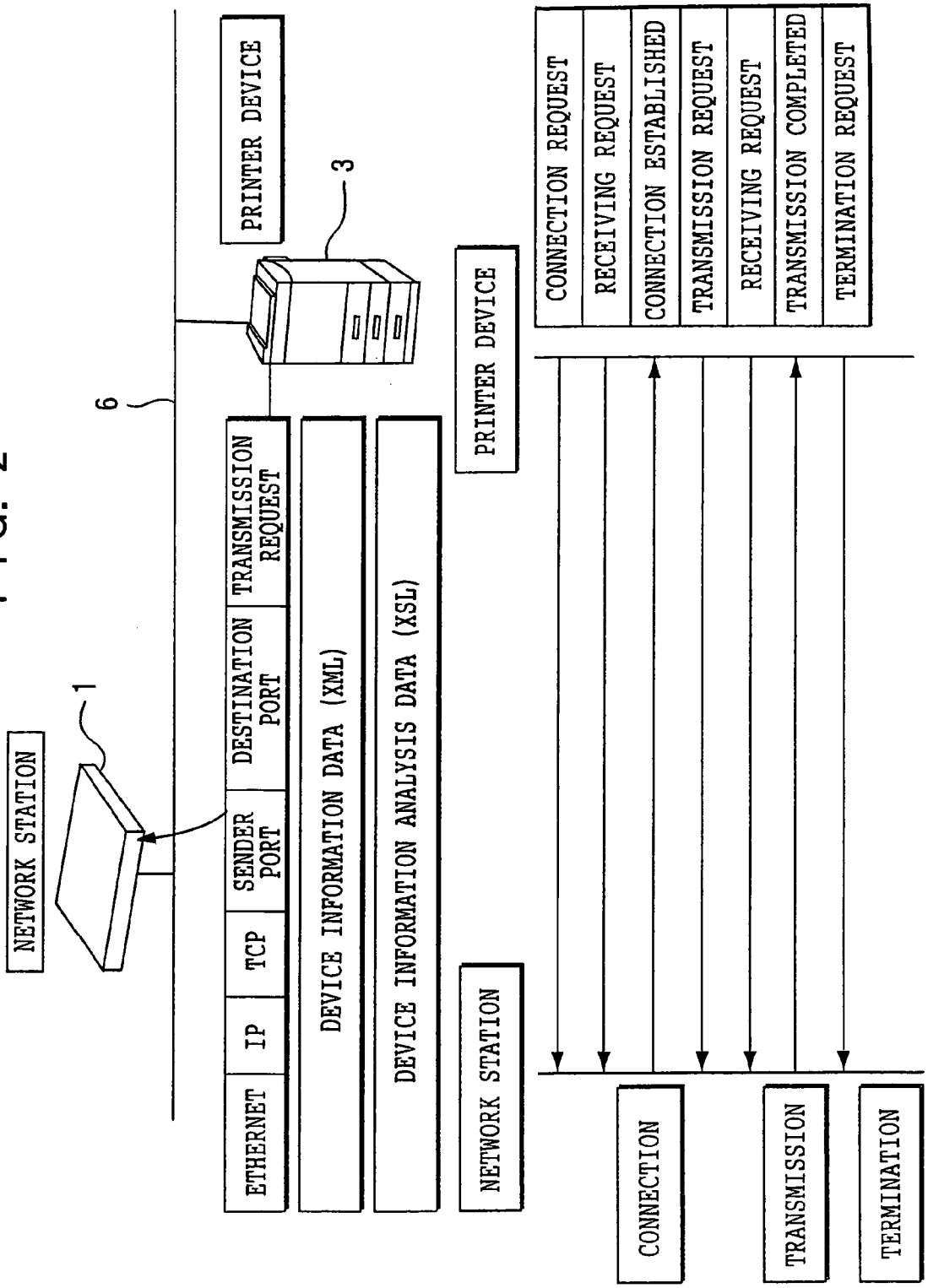

F I G. 1 1
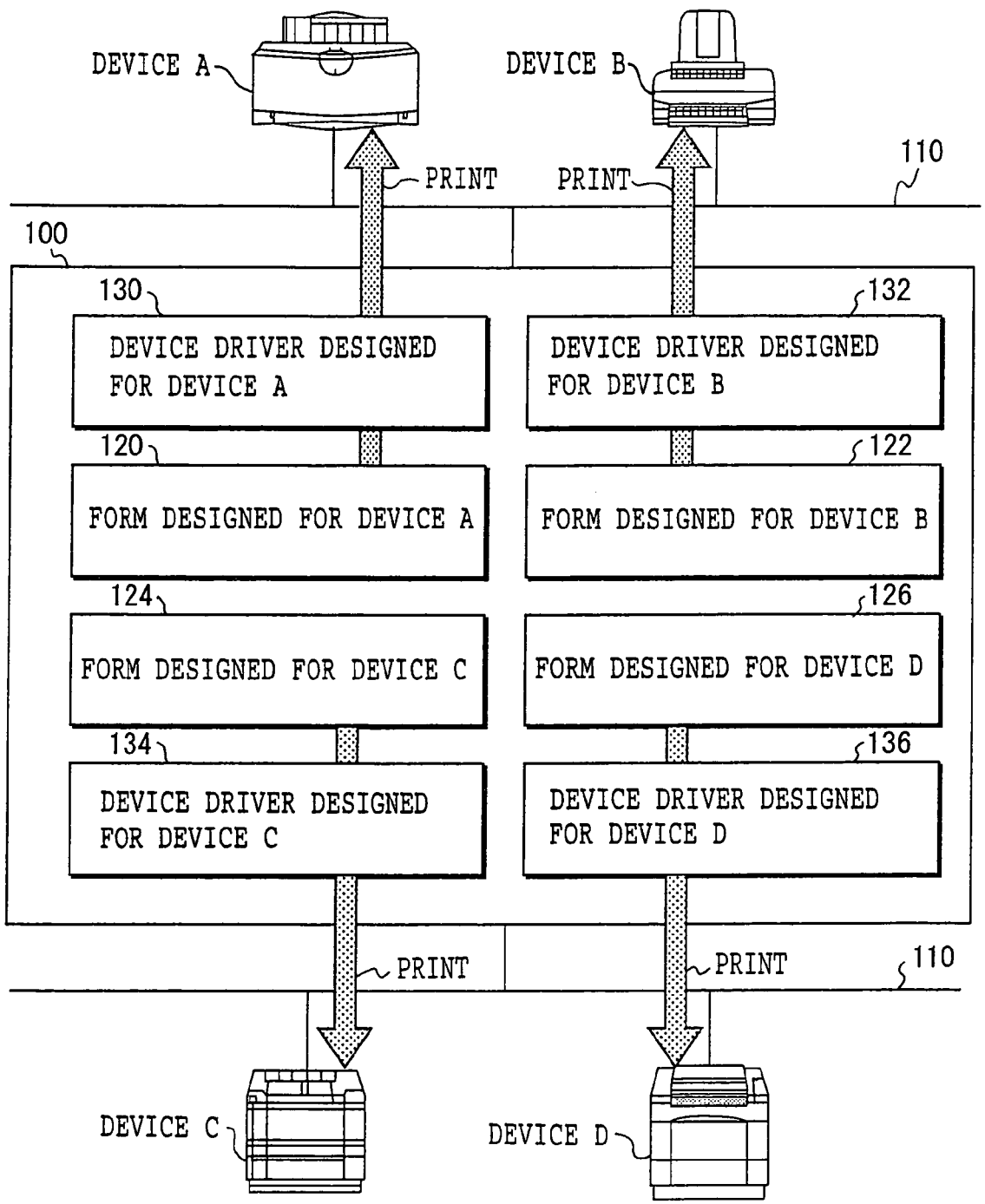

NETWORK PRINTING SYSTEM, NETWORK PRINTING DEVICE AND NETWORK PRINTING METHOD

TECHNICAL FIELD

The present invention relates to a network printing system, a network printing device and a network printing method for converting print data into formats suitable for printing devices that are connected to a network. More particularly, the invention relates to a network printing system, a network printing device and a network printing method for allowing use of printing devices having different device specifications connected to a network.

BACKGROUND ART

Along with development in networking technologies, various information processing devices and peripheral devices have come to be connected via networks. Particularly, in a case where several printing devices are connected to a network as peripheral devices, the printing devices may have different device specifications.

For example, an inkjet printing device and an electrophotographic printing device have different device specifications such as a print start position and a resolution. Further, inkjet printing devices that have different functions or that are provided by different manufacturers have different device specifications. This is also the case for electrophotographic printing devices.

There is no problem in a case where only printing devices having the same device specification are connected to a network. However, if existing printing devices are connected to a network, or a printing device with advanced functions is newly connected to a network, printing devices with various device specifications are connected to the network.

In such a network printing system, for enabling each client to use printing devices having different device specifications, it is preferable to provide a server, and give the server functions for accommodating the printing devices having different device specifications.

FIG. 11 is a structural diagram of a first conventional network printing system. As shown in FIG. 11, a server 100 is provided, which is connected to printing devices A, B, C and D via a network 110. Although not shown in the drawing, a number of clients are connected to the network 10.

The server 100 stores individual settings, form formats 120, 122, 124 and 126 for print configuration, device drivers 130, 132, 134 and 136, and the like, for printing on the respective printing devices A, B, C and D. As the server 100 receives a print request from a client via the network, the server 100 performs editing with a form format for a specified printing device, and creates print data with a device driver for the specified printing device, and then, sends the print data to the specified printing device.

FIG. 12 is a structural diagram of a second conventional network printing system. Device drivers in the server 100 are specified so as to be grouped according to common device or operable with a common program, and these common device drivers 138 and 139 are stored. This lightens the burden in design jobs that is imposed on printing device manufacturers and network system engineers.

However, in these conventional technologies, form formats and device drivers are necessary for respective printing devices. Therefore, it is necessary that printing device manufacturers or network system engineers design data and formats in accordance with device properties of the respective printing devices. As the system structure of the network becomes wide-ranging, the design jobs become troublesome. In some cases, product manufacturers and system engineers of the old systems cannot manage by themselves, and it becomes necessary to reconstruct the system and discard old resources. This leads to possibilities of increase in the cost burden and delay in the system introduction schedule.

DISCLOSURE OF INVENTION

Therefore, an object of the present invention is to provide a network printing system, a network printing device and a network printing method, which lightens the burden in design jobs that is imposed on printing device manufacturers and network system engineers.

Another object of the invention is to provide a network printing system, a network printing device and a network printing method allowing operation of individual printing devices even when data and formats are designed without considering device properties of the individual printing devices connected to the network.

Yet another object of the invention is to provide a network printing system, a network printing device and a network printing method for accomplishing reduction in system introduction cost by lightening the burden in design jobs imposed on product manufacturers and system engineers.

In order to accomplish these objects, the network printing system of the invention is a network printing system with plural printing devices connected to a network, the system including: plural printing devices; and a network device for converting print-request data sent from a print requester into a format for a specified printing device to create print data, and transmitting the print data to the specified printing device via the network, wherein the network device includes: a device information storage section for storing device information representing print specifications for the plurality of printing devices; a document definition file storage section for storing a document definition file representing a definition of a document; and a format converting section for converting the print-request data into the print format for the printing device based on the document definition file specified in the print-request data and the device information of the printing device.

Further, the network printing device of the invention is a network printing device for conducting printing with a specified printing device among plural printing devices connected to a network, the network printing device including: a device information storage section for storing device information representing print specifications for the plural printing devices; a document definition file storage section for storing a document definition file representing a definition of a document; and a format converting section for converting, based on the document definition file specified in print-request data sent from a print requester and the device information of the printing device, the print-request data into the print format for the printing device.

Furthermore, the network printing method of the invention is a network printing method for conducting printing with a specified printing device among plural printing devices connected to a network, the method including: creating print data by converting print-request data sent from a print requester via the network into a format for the specified printing device; and transmitting the print data to the specified printing device via the network, wherein the creating includes: retrieving device information of the printing device specified in the print-request data from a device information storage section for storing device information representing print specifications for the plural printing devices; retrieving a document definition file specified in the print-request data from a document definition file storage section for storing a document definition file representing a definition of a document; and converting the print-request data into the print format for the printing device based on the retrieved document definition file and the retrieved device information of the printing device.

In the system of the invention, even when the same form is printed with printers having different device information, device information of the printers is checked in advance to automatically generate print data. Therefore, the form can be printed without changing the form definition and/or redesigning the form for each printer. That is, data and formats can be designed without considering individual printer devices.

Further, there is no need for dedicated software and a device driver for each device, and a new printer device can be easily connected to a network system.

Moreover, the system of the invention allows system management in an integrated fashion and facilitates system maintenance.

It is preferable in the invention that the network device acquires the device information of the printing devices via the network and stores the device information in the device information storage section. Since the device information is automatically acquired via the network, acquisition of the device information is facilitated.

Further, in the invention, it is preferable to further include a client device that registers the document definition file in the network device via the network and transmits the print-request data to the network device via the network. Document definition files can be easily registered via the network.

Furthermore, it is preferable in the invention that the format converting section calculates a printable area of the printing device based on the device information, and calculates a print position of each item defined in the document definition file with reference to the printable area. In this manner, print data with a print position according to a printable area of each printing device can be generated.

In addition, it is preferable in the invention that the network device determines whether the specified printing device is available for printing, and if the specified printing device is not available for printing, then uses device information of an alternative printing device to create the print data and transmits the print data to the alternative printing device. This enables a print job to be switched to a printing device other than the specified one, thereby allowing response to the event of a failure of the printing device, or distribution of print jobs among printing devices.

BRIEF DESCRIPTION OF DRAWINGS

FIG. 1 is a structural diagram of a network system of an embodiment of the present invention;

FIG. 2 is an explanatory diagram for explaining a communication procedure of the network of FIG. 1;

FIG. 11 is an explanatory diagram of a first conventional network printing system.

BEST MODE FOR CARRYING OUT THE INVENTION

Now, embodiments of the present invention are described in the order of a network printing system, a first embodiment, a second embodiment and other embodiments.

[Network Printing System]

Figure 3:
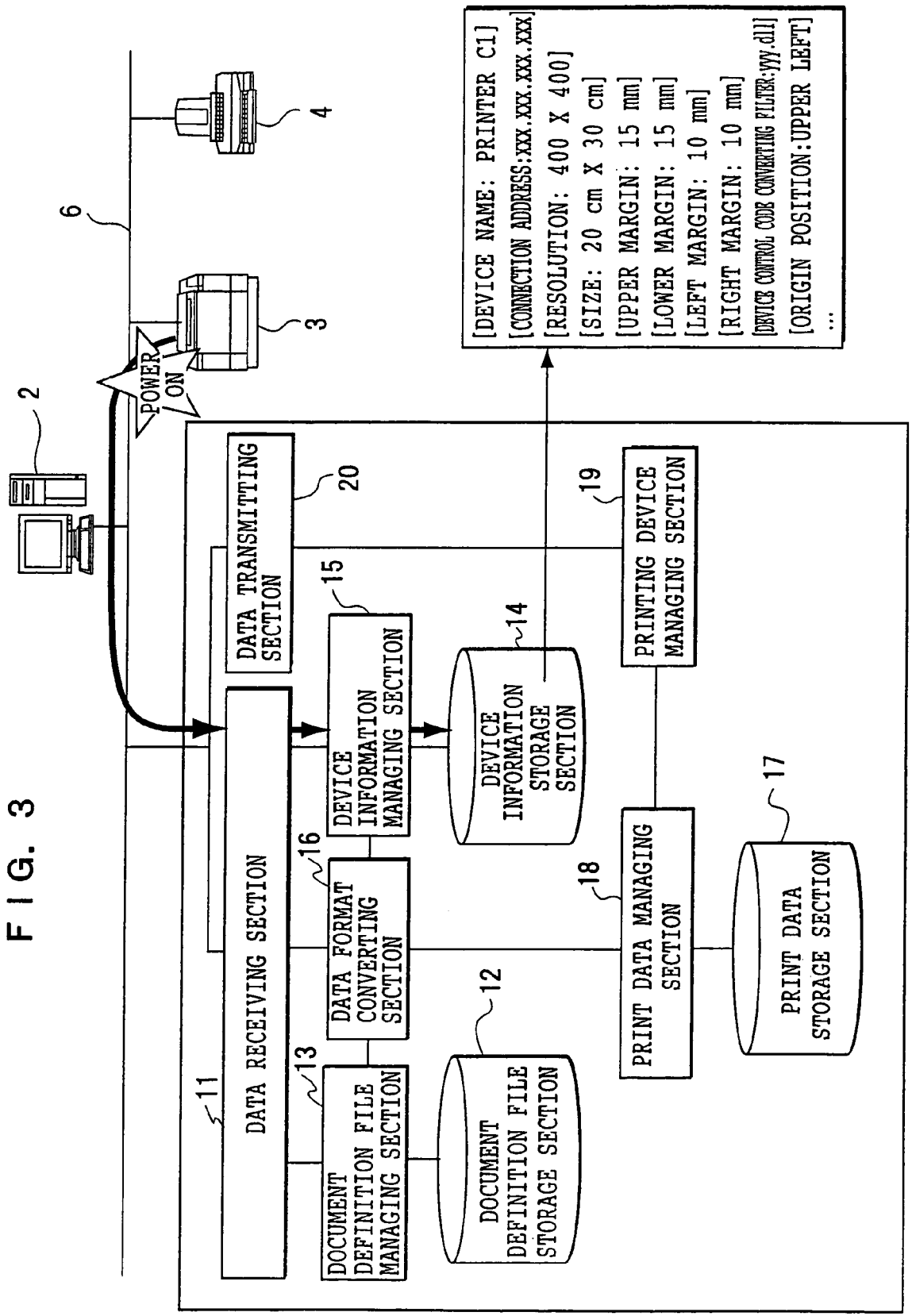
FIG. 3 is an explanatory diagram for explaining a device information registering operation of the network system of FIG. 1.
Figure 4:
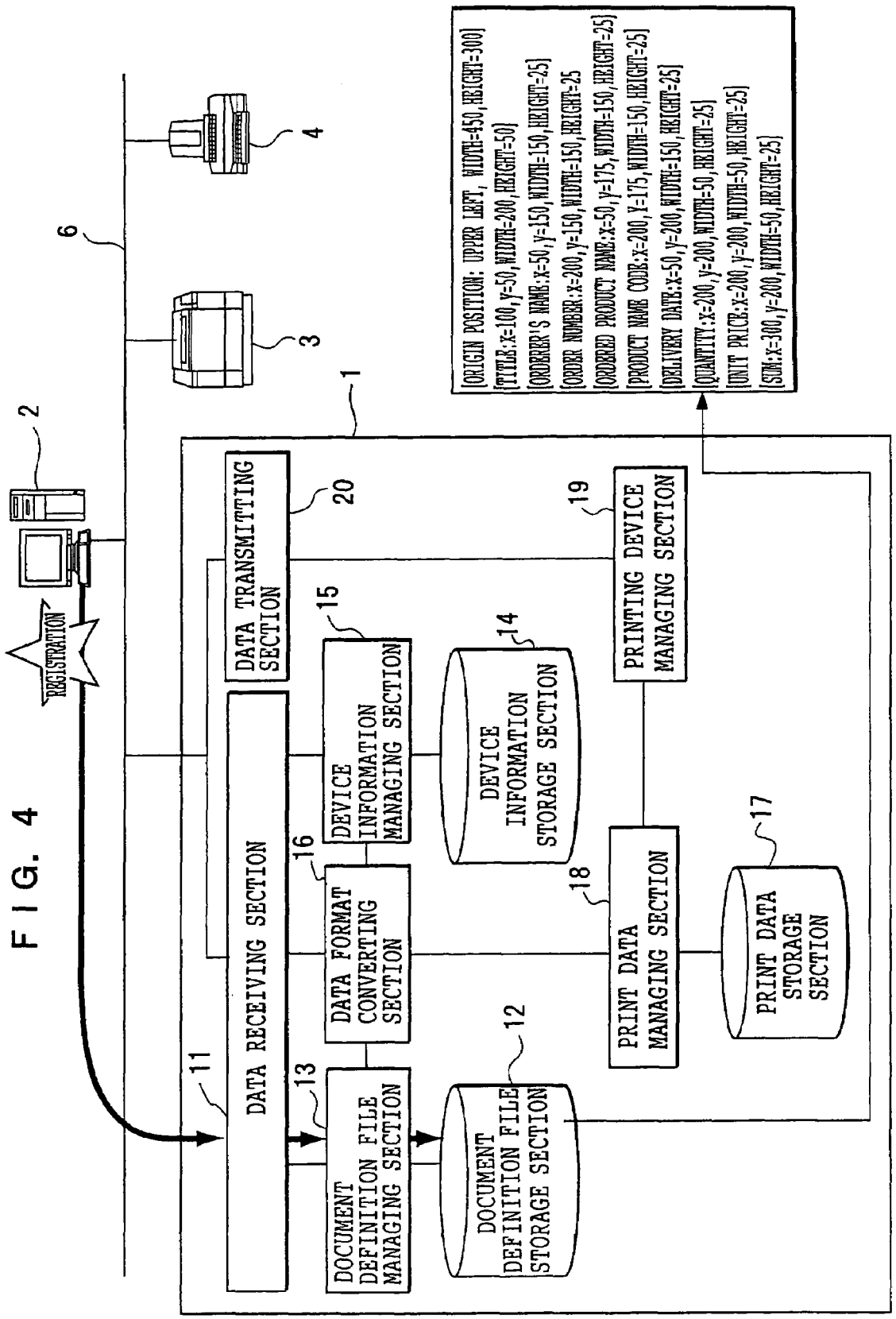
FIG. 4 is an explanatory diagram for explaining a form definition file registering operation of the network system of FIG. 1.

FIG. 1 is a structural diagram of a network system of the first embodiment of the invention, FIG. 2 is an explanatory diagram for explaining a communication procedure of the network of FIG. 1, FIG. 3 is an explanatory diagram for explaining a device information registering operation of the network system of FIG. 1, and FIG. 4 is an explanatory diagram for explaining a form definition file registering operation of the network system of FIG. 1.

In FIG. 1, a network station 1 receives a print request directed to a printing device and converts the data into print data having a format suitable for the printing device, and an application server 2 executes a print program, and the like. Printers 3 and 4 have different functions.

The application server 2 and the printers 3 and 4 are respectively connected to the network station 1 via a network 6. Further, a number of client PCs (personal computers), which are print requesters, are connected to the network 6.

The network station 1 includes a data receiving section 11, a data transmitting section 20, a document definition file storage section 12, a device information storage section 14, and a print data storage section 17. The network station 1 further includes a document definition file managing section 13, a device information managing section 15, a print data managing section 18, a printing device managing section 19, and a data format converting section 16.

The data receiving section 11 receives data such as instructions for document definition file registration and instructions for printing sent from the application server 2 and device information sent from the printers 3 and 4.

The document definition file storage section 12 stores received document definition files. The document definition file managing section 13 manages the stored document definition files. The device information storage section 14 stores received device information of the printing devices. The device information managing section 15 manages the stored device information files.

The data format converting section 16 generates print data according to a print request based on the document definition file and the device information. The print data storage section 17 stores the print data generated at the data format converting section 16. The print data managing section 19 manages the stored print data.

The printing device managing section 19 manages connection with the respective printing devices. The data transmitting section 20 transfers the print data to the printing device 3 or 4. It should be noted that the respective managing sections 13, 15, 18 and 19 and the converting section 16 are implemented in the form of software executed by a processor. Further, the storage sections 12, 14 and 17 are formed of a storage device such as a memory.

The document definition file storage section 12 stores form definitions, in which data portions to be printed are inserted. The form definitions define formats of forms such as order sheets. The document definition file managing section 13 manages the form definitions stored in the document definition file storage section 12 on an individual file basis.

The device information storage section 14 stores device information obtained from the printing devices 3 and 4 in advance. The device information includes a "device name", a "connection address", a "resolution", a "size", an "upper margin", a "lower margin", a "left margin", a "right margin", a "device control code converting filter", an "origin position", and the like. The device information managing section 15 manages the device information on an individual device basis.

The data format converting section 16 retrieves a form definition file, which is associated with print-request data transferred from the application server 2, from the document definition file storage section 12 via the document definition file managing section 13. The data format converting section 16 also retrieves information about a printing device specified in the print request from the device information storage section 14 via the device information managing section 15.

The data format converting section 16 determines an actual print position and a print area according to information of the "resolution", the "size", the "upper margin", the "lower margin", the "left margin", the "right margin" and the "origin position" included in the retrieved device information. In addition, using the "device control code converting filter", the data format converting section 16 generates format data through conversion into a code or a language that can be analyzed by the relevant printing device.

The format data is stored in the print data storage section 17, and managed by the print data managing section 18 as a print cue. Then, the data is transferred to the printing device 3 or 4 specified in the print request via the data transmitting section 20, and is printed.

As described above, the network station 1 acquires the device information of the printing devices 3 and 4, and converts data and formats into a format suitable for the specified printer according to the device information. Therefore, a system can be provided that allows system engineers to design data and formats without considering individual devices. Further, a device can be provided that can be easily connected to a network system without device (server and printer) manufacturers developing dedicated software or a device driver for each device.

The embodiment of the invention is described further. FIG. 2 is an explanatory diagram for explaining the network system of FIG. 1. As shown in FIG. 2, this network system is formed of a standardized system referred to as the OSI (Open System Interconnection) Reference Model, and composed of seven layers including a data link layer, a network layer, a transport layer, a session layer, a presentation layer and an application layer.

To notify device information, the session layer, the presentation layer and the application layer, which are upper layers of these seven layers, are used. In FIG. 2, device information is notified from the printer 3 to the network station 1 using FTP (File Transfer Protocol).

First, as shown in FIG. 3, the network station 1 obtains the device information of the printing devices 3 and 4 and stores the device information in the device information storage section 14. For example, when the printing device 3 is powered on, the printer 3 requests connection to the network station 1 using the FTP protocol, as shown in FIG. 2. When the connection is established, the printer 3 requests transmission and transfers a device information file described in the XML description language and an XSL file defining meanings of XML tags for analysis of device information.

As shown in FIG. 3, the device information of the printer 3 includes respective setting values for the "device name", the "connection address", the "resolution", the "size", the "upper margin", the "lower margin", the "left margin", the "right margin", the "device control code converting filter" and the "origin position".

Next, registration of a form definition file is described with reference to FIG. 4. Assuming that an order sheet is printed, for example, a system engineer creates a form definition file including data items and attributes that are necessary for producing the order sheet, and the form definition file is transferred from the application server 2 to the network station 1 in advance to be registered, as shown in FIG. 4. The network station 1 stores the transferred form definition file in the document definition file storage section 12.

As shown in FIG. 4, in the case of the order sheet in this embodiment, for example, data and attributes of the document definition (form definition) file are composed of a "title", an "orderer's name", an "order number", a "product name code", a "delivery date", an "order quantity", a "unit price", a "sum", and the like, and as their attributes, attribute information such as "origin information", a "start position", a "width", a "height", a "color", a "frame" and a "text decoration" are defined. A system engineer can create a document definition file without considering properties, and the like, of printers.

Using such device information and a form definition file, a format of print-request data is converted as described below.

First Embodiment

Figure 5:
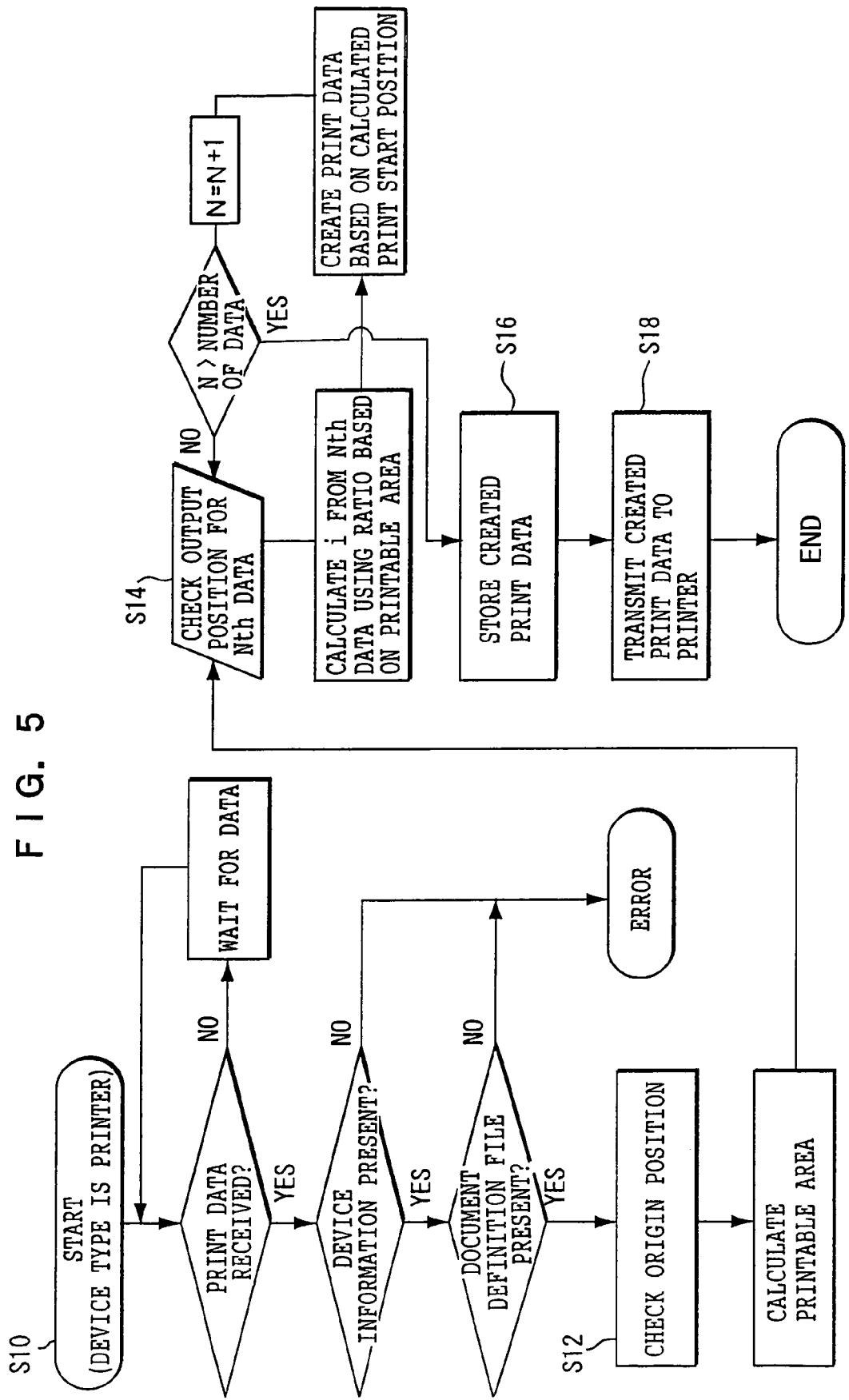
FIG. 5 is a flow chart illustrating a flow of a print data creating process of a first embodiment of the invention.
Figure 6:
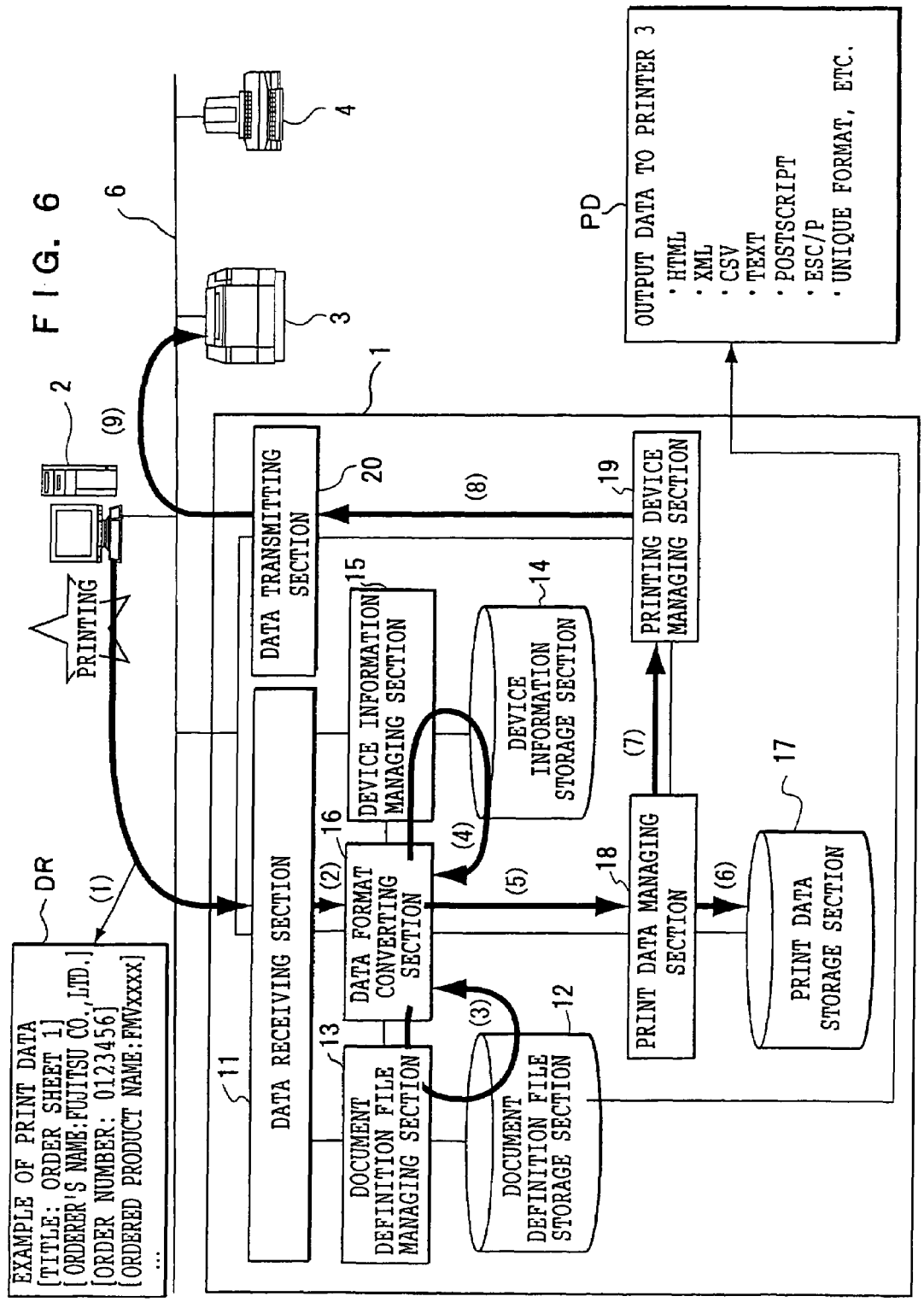
FIG. 6 is an explanatory diagram for explaining operation of the network system in the process of FIG. 5.
Figure 7:
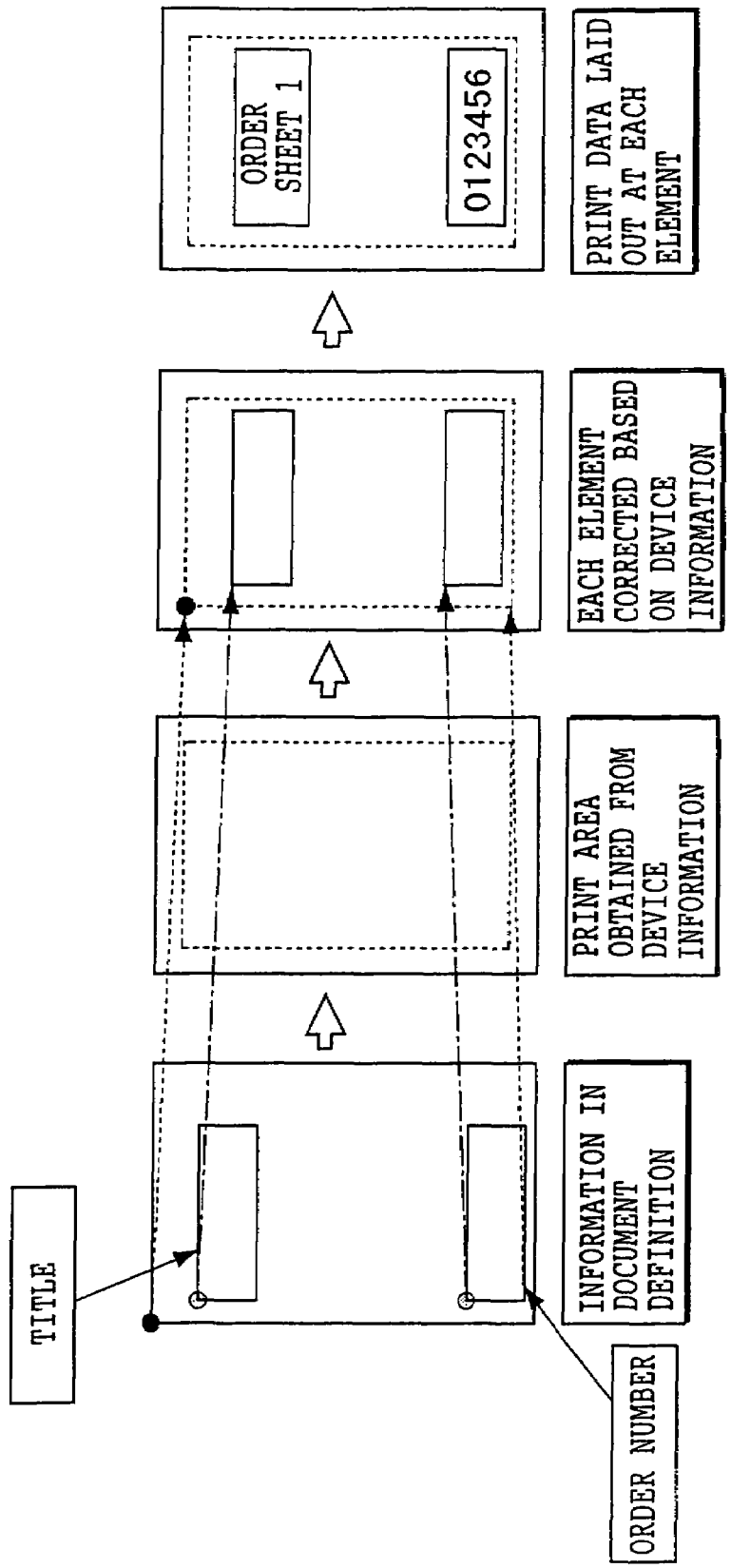
FIG. 7 is an explanatory diagram for explaining print data in the operation of FIG. 5.

FIG. 5 is a flow chart of a process in the network station of FIG. 1, FIG. 6 is an explanatory diagram for an operation of FIG. 5, and FIG. 7 is an explanatory diagram for a print data creating process of FIG. 5.

(S10) Print initiation is carried out in the network station 1 by the application server 2. The data receiving section 11 in the network station 1 receives a data portion. At this time, the received data DR includes a name of a relevant form definition file, a name of a printer used for printing, print-request data, and the like. The data receiving section 11 sends the received data to the data format converting section 16.

The data format converting section 16 is activated when a device specified in the request is a printer, and waits for completion of reception of the print data. Once the data format converting section 16 has received the print data, as shown in (2) in FIG. 6, the data format converting section 16 analyzes the print data. Then, the data format converting section 16 sends a query to the document definition file managing section 13 with the name of the form definition file included in the print data to search for the relevant form definition in the document definition file storage section 12 ((3) in FIG. 6). Further, the data format converting section 16 sends a request to the device information managing section 15 with the name of the printer to be used for printing included in the print data to obtain device information of the printer to be used for printing ((4) in FIG. 6). It should be noted that, if the relevant form definition file and/or the device information are not registered in the storage sections 12 and 14, "Error" is notified.

(S12) Subsequently, the data format converting section 16 checks the origin position from the obtained device information, and calculates a printable area. Namely, the data format converting section 16 checks the "origin position" from the device information of the printer, and calculates a printable area (size) based on the information of the "size", the "upper margin", the "lower margin", the "left margin" and the "right margin".

(S14) With respect to this printable size, a printable position for each data on the printer is calculated based on the positional information found in the data items and attributes in the form definition. For example, as shown in FIG. 7, it is assumed that the "size" in the device information is 20 cm in an X direction and 30 cm in a Y direction. Further, it is assumed that a specified position of a certain character in the form definition is 1.0 cm in the X direction and 29.0 cm in the Y direction, and a height of the character is 1.0 cm. Meanwhile, assuming that right and left margins are respectively 1.0 cm, and upper and lower margins are respectively 1.5 cm for the printable area calculated from the device information, only 27.0 cm is available in the Y direction. Therefore, for printing this character, the height of 29.0+1.0=30.0 cm is reduced to 27.0 cm (90%). Considering the overall balance, the height of the character is also reduced from 1.0 cm to 0.9 cm, and the specified position of the character in the Y direction is changed to 26.1 cm. With respect to this calculation, a number of dots is calculated such that, if the resolution is 400×400 dpi, then the height of the character is fount to be 400×0.9/25.4=14 dots and the specified position of the character is found to be 400×26.1/25.4=411 dots.

That is, each data n is taken from the print-request data, and an output position in the form definition is checked. Then, a print start position for each data is calculated using a ratio found from the printable area obtained from the device information, and print data is created using the print start position and the height of the character. Thereafter, a data pointer n is incremented by "1", and whether the data has been finished is determined. This is repeated by a number of times corresponding to the number of print-request data.

(S16) The calculated printable position (the print start position and the height of the character) is converted into a data file that can be recognized by each device using the "device control code converting filter" in the device information. In this case, the printable position is converted, for example, into a document description language such as HTML (Hyper Text Markup Language) or XML (eXtensive Markup Language), or a program or emulation data such as Java Applet data, and is used as parameters for creating a print data file. The created print data is passed, together with a character code, to the print data managing section 18, and is stored in the print data storage section 17.

(S18) The stored print data is passed to the printing device managing section 19. The printing device managing section 19 checks the status of the relevant printing device, and transfers the data to the data transmitting section 20. The data transmitting section 20 sends the data to the printer device 3. Thus, the printer 3 prints the data.

As described above, in the system of the invention, even when the same form is printed with the printing devices 3 and 4 having different device information, the device information of the printing devices 3 and 4 is checked in advance to automatically generate print data. Therefore, the form can be printed without changing the form definition and/or redesigning the form for each printer.

Second Embodiment

Figure 8:
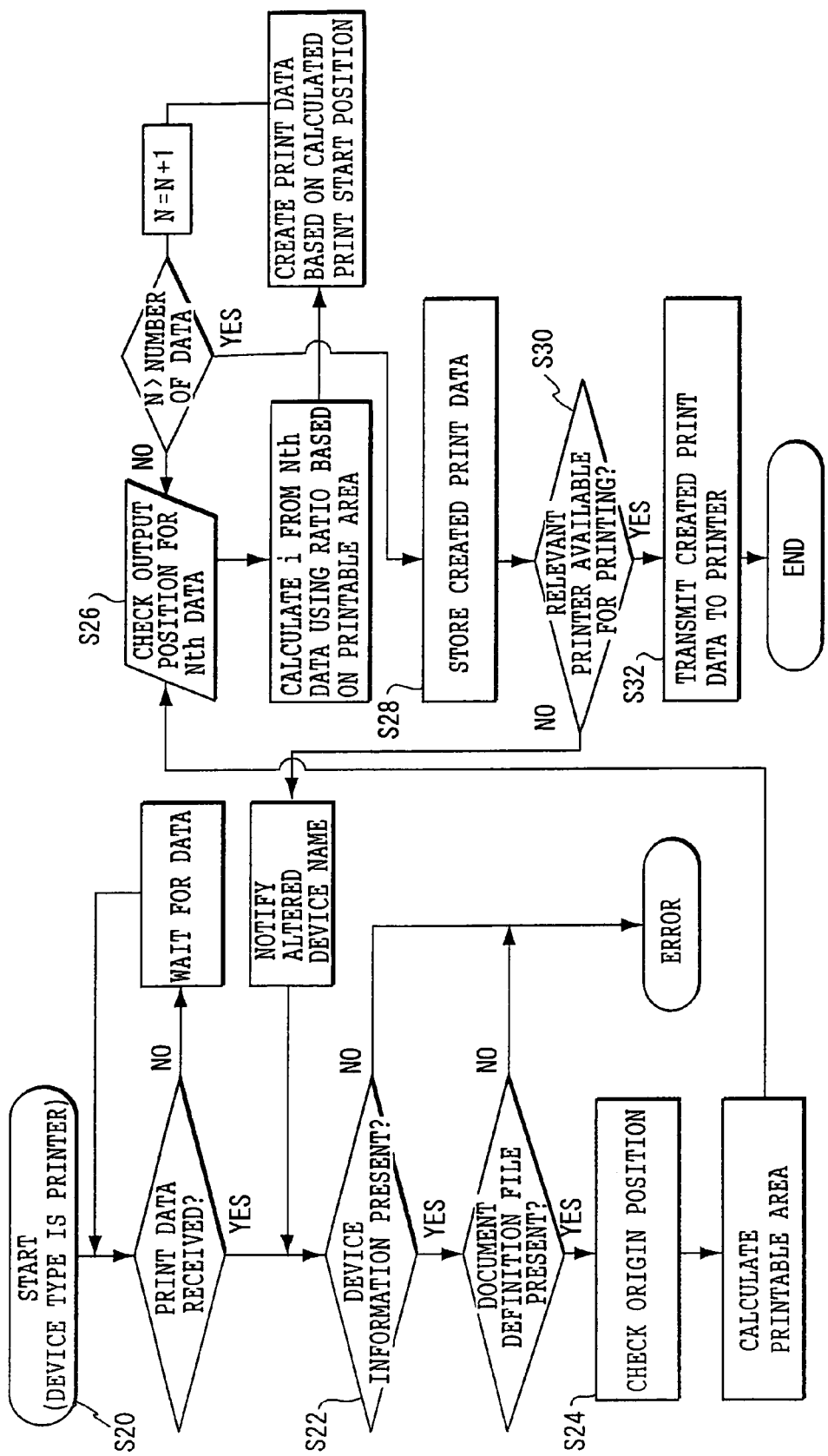
FIG. 8 is a flow chart illustrating a print data creating process of a second embodiment of the invention.
Figure 9:
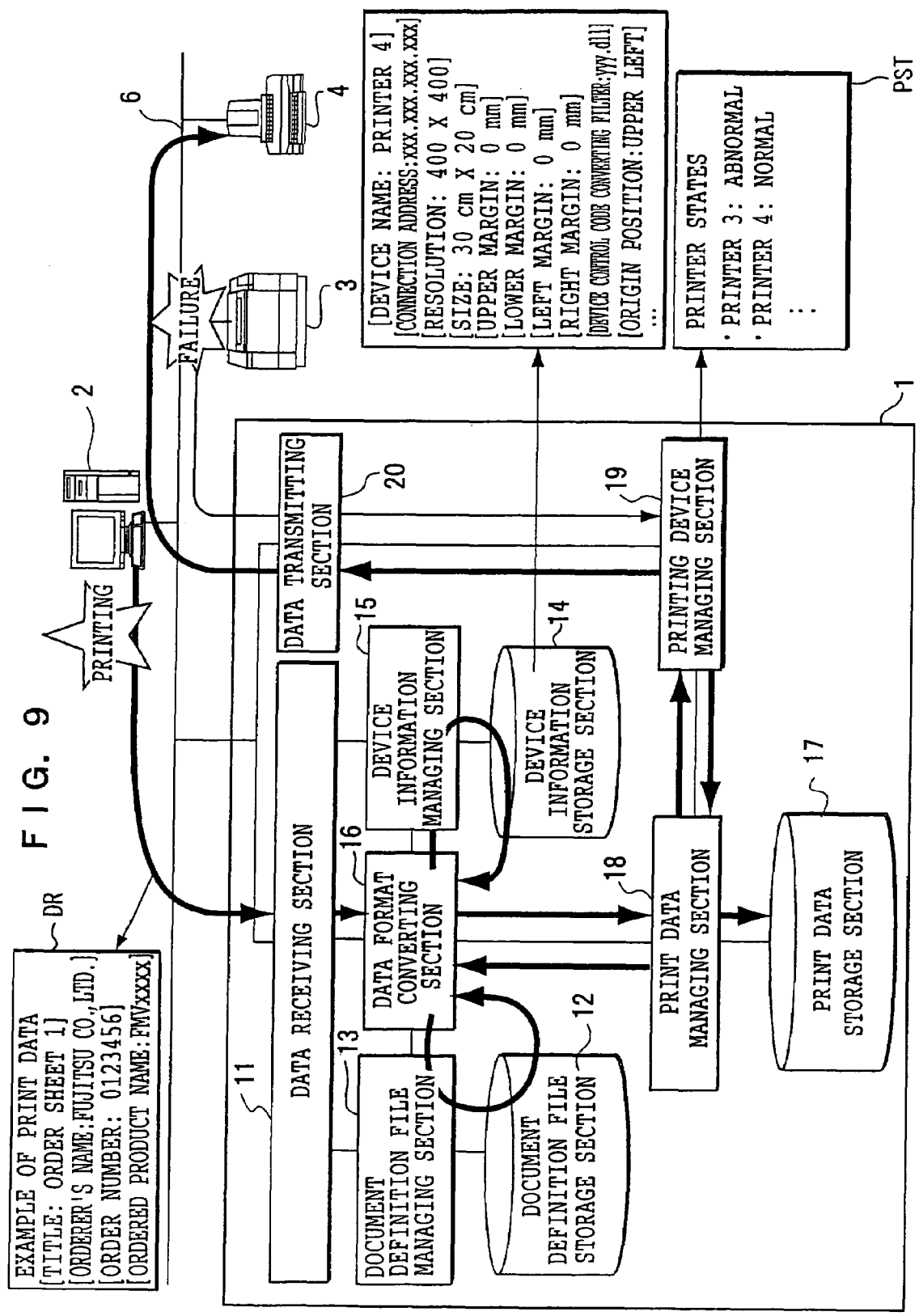
FIG. 9 is an explanatory diagram for explaining operation of the network system in the process of FIG. 8.
Figure 10:
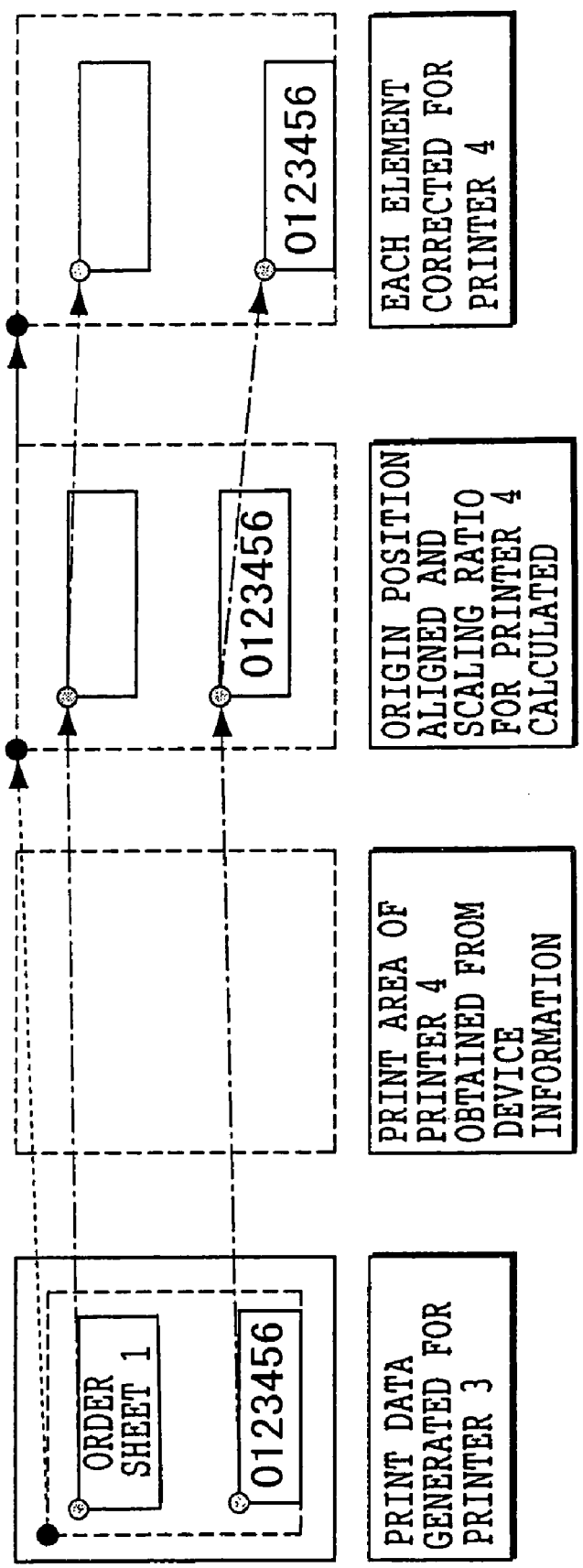
FIG. 10 is an explanatory diagram for explaining print data in the operation of FIG. 8.
Figure 12:
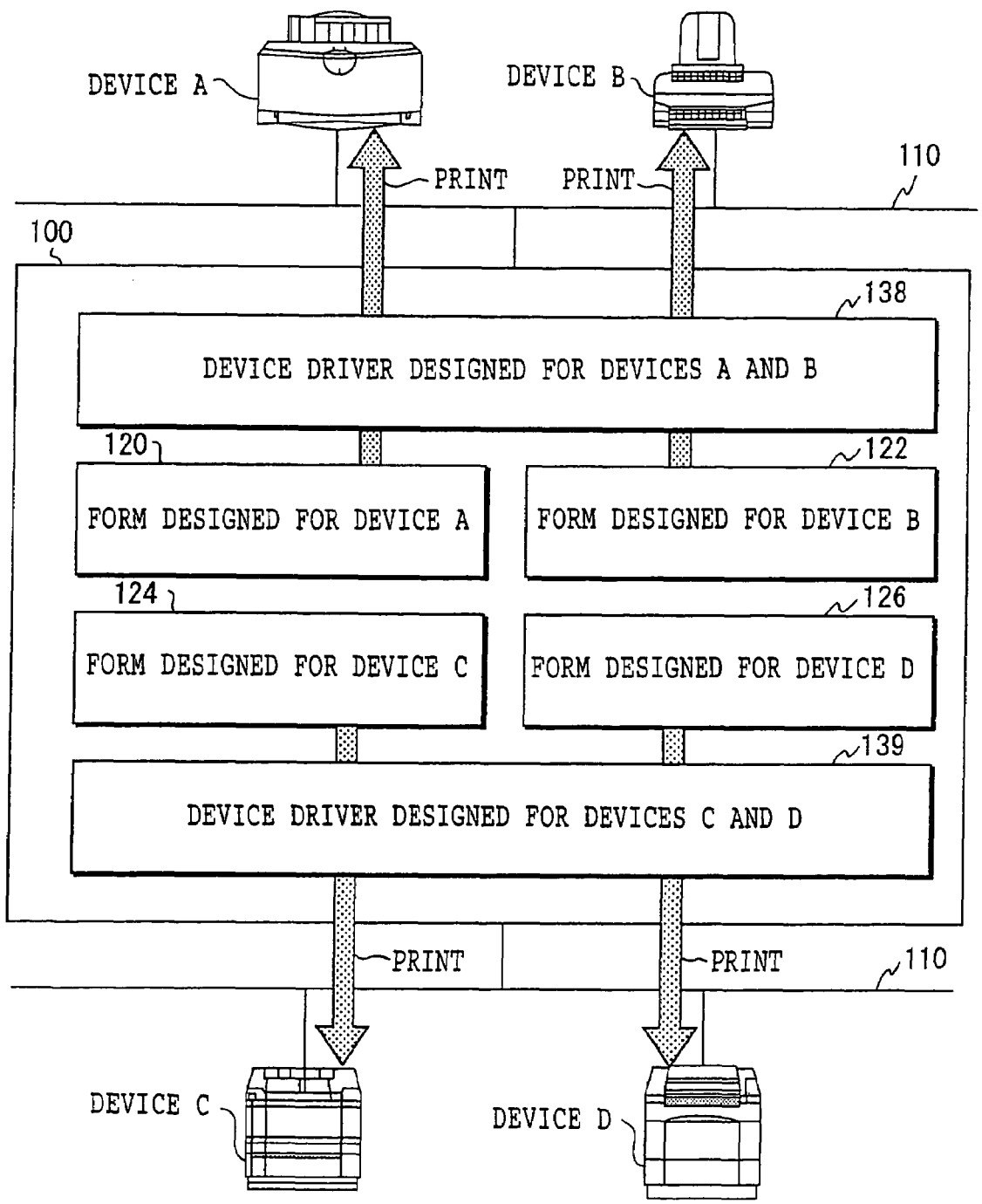
FIG. 12 is an explanatory diagram of a second conventional network printing system.

FIG. 8 is a flow chart of a process in the network station of FIG. 1 of the second embodiment, FIG. 9 is an explanatory diagram for an operation of FIG. 8, and FIG. 10 is an explanatory diagram for a print data creating process of FIG. 8.

FIGS. 8 through 10 illustrates a case where, when data from the application server 2 is to be printed on the printer 3 as in the first embodiment of FIGS. 5 through 7, and the printer 3 is not available for printing due to any cause, the printing device managing section 19 searches for the alternative printer 4 available for printing, and the print data, which has been ready for transmission, is converted for the printer 4 to be printed on the printer 4. Explanation thereof is made below using the process flow of FIG. 8 and with reference to FIGS. 9 and 10.

(S20) Print initiation is carried out in the network station 1 by the application server 2. The data receiving section 11 in the network station 1 receives a data portion. At this time, the received data DR includes a name of a relevant form definition file, a name of a printer used for printing, print-request data, and the like. The data receiving section 11 sends the received data to the data format converting section 16.

The data format converting section 16 is activated when a device specified in the request is a printer, and waits for completion of reception of the print data.

(S22) Once the data format converting section 16 has received the print data, the data format converting section 16 analyzes the print data. Then, the data format converting section 16 sends a query to the document definition file managing section 13 with the name of the form definition file included in the print data to search for the relevant form definition file in the document definition file storage section 12. Further, the data format converting section 16 sends a request to the device information managing section 15 with the name of the printer to be used for printing included in the print data to obtain device information of the printer to be used for printing. It should be noted that, if the relevant form definition file and/or the device information are not registered in the storage sections 12 and 14, "Error" is notified.

(S24) Subsequently, the data format converting section 16 checks the origin position from the obtained device information, and calculates a printable area. Namely, the data format converting section 16 checks the "origin position" from the device information of the printer, and calculates a printable area (size) based on the information of the "size", the "upper margin", the "lower margin", the "left margin" and the "right margin".

(S26) With respect to this printable size, a printable position for each data on the printer is calculated based on the positional information found in the data items and attributes in the form definition. That is, each data n is taken from the print-requested data, and an output position in the form definition is checked. Then, a print start position for each data is calculated using a ratio found from the printable area obtained from the device information, and print data is created using the print start position and the height of the character. Thereafter, a data pointer n is incremented by "1", and whether the data has been finished is determined. This is repeated by a number of times corresponding to the number of print-request data.

(S28) The calculated printable position (the print start position and the height of the character) is converted into a data file that can be recognized by each device using the "device control code converting filter" in the device information. In this case, the printable position is converted, for example, into a document description language such as HTML (Hyper Text Markup Language) or XML (eXtensive Markup Language), or a program or emulation data such as Java Applet data, and is used as parameters for creating a print data file. The created print data is passed, together with a character code, to the print data managing section 18, and is stored in the print data storage section 17.

(S30) The stored print data is passed to the printing device managing section 19. The printing device managing section 19 checks the status of the relevant printing device. As shown in FIG. 9, the printing device managing section 19 is provided with a printer status table PST that indicates the status (abnormal, normal) of each printer. The printing device managing section 19 refers to the printer status table PST to check the status of the relevant printer. If it is determined that the relevant printer is not available for printing (for example, abnormal), the printing device managing section 19 finds an alternative printer (the printer 4 in this case) and notifies the name of the alternative device to the print data managing section 18. As the print data managing section 18 recognizes the alteration of the device name, the print data managing section 18 requests the data format converting section 16 to regenerate the print data. Returning to step S22, the data format converting section 16 regenerates the print data based on the notified device information.

(S32) On the other hand, if it is determined that the relevant printer is available for printing based on the printer status table PST, the print data is transferred to the data transmitting section 20 via the printing device managing section 19, and then transmitted to the altered printer device 4. Thus, the printer 4 prints the data.

As shown in FIG. 10 for example, a case is considered where the calculated print data for the printer 3, as in the first embodiment, is switched to the printer 4. It is assumed that, for the printer 3, the "size" is 20 cm in the X direction and 30 cm in the Y direction, the "left margin" and the "right margin" are 1 cm, and the "upper margin" and the "lower margin" are 1.5 cm. First, the device information of the printer 4 is obtained from the device information storage section 14. It is assumed that, in the device information of the printer 4, the "size" is 20 cm in the X direction and 30 cm in the Y direction, the "origin position" is 0 cm in the X direction and 0 cm in the Y direction, and the "left margin", the "right margin", the "upper margin" and the "lower margin" are respectively 0 cm.

At this time, aligning the origin position in the print data of the printer 3 with the origin position obtained from the device information of the printer 4, the printable area is found to be 20/(20−1−1)=1.1 times in the X direction and 30/(30−1.5−1.5)=1.1 times in the Y direction. Therefore, using the position of the character specified in the print data of the printer 3 (0.9 cm in the X direction and 26.1 cm in the Y direction), calculation is made as 0.9×1.1=1.0 cm in the X direction and 26.1×1.1=28.7 cm in the Y direction. Based on this calculation, the print data is regenerated and transferred to the print data managing section 18.

The transferred print data is transmitted to the printer 4 via the data transmitting section 20, and printed in an almost similar print structure to that for the printer 3.

Other Embodiments

Besides the above-described embodiments, the following modifications can be made in the invention.

(1) Although the status of the printer is checked and the alternative printer is searched for after the print data has been created in the second embodiment, the status of the relevant printer may be checked before the print data is created. In this case, if the relevant printer is not available for printing, then the alternative printer is searched for and the print data for the alternative printer is created.

(2) Although the case where the network station is provided in the network for converting print-request data into print data for a specified printer, this function may be implemented by the other devices in the network, such as the application server 2.

The present invention has been described with reference to the embodiments. However, various modifications can be made within the scope of technical spirit of the invention, and such modifications are not excluded from the technical scope of the invention.

INDUSTRIAL APPLICABILITY

In the system of the present invention, even when the same form is printed with the printing devices 3 and 4 having different device information, the device information of the printing devices 3 and 4 is checked in advance to automatically generate print data. Therefore, the form can be printed without changing the form definition and/or redesigning the form for each printer. That is, data and formats can be designed without considering individual printer devices.

Further, there is no need for dedicated software and a device driver for each device, and a new printer device can be easily connected to a network system.

Moreover, the system of the invention allows system management in an integrated fashion and facilitates system maintenance.

The invention claimed is:

1. A network printing system with a plurality of printing devices connected to a network, the system comprising:
the plurality of printing devices; and
a network device for converting print-request data sent from another device on the network into a format for a specified printing device to create print data, and transmitting the print data to the specified printing device via the network, wherein the network device comprises:
a data receiving section that receives a print request from the another device on the network, the print request including a name of a specified document definition file, a name of the specified printing device, and the print-request data;
a device information storage section for storing device information representing printing device specifications for the plurality of printing devices, the device information containing a size and margins;
a document definition file storage section for storing one or more document definition files, including the specified document definition file, each document definition file representing one or more layouts of one or more documents, each document definition file including a length and a plurality of position indications for placing respective text portions, and
a format converting section for determining an actual print area according to at least one of the size and the margins of the device information and converting print-request data into a print format for the printing device specified in the received print request based on a ratio between the length in the specified document definition file and a length in device information corresponding to the printing device specified in the received print request, wherein the print-request data includes text portions for each respective position indication in the plurality of position indications in the specified document definition file;

the format converting section inserts the text portions into positions in the print data sent to the specified printing device according to the respective position indications in the specified document definition file, the specified document definition file is stored in the document definition file storage section in advance of transmission of the text portions in the print-request data, and the network printing system determines whether the specified printing device is available, and if the network printing system determines that the specified printing device is unavailable, the format converting section corrects each element in the print data so that the print data is reformatted for an alternative printing device based on device information for the alternative printing device.

2. The network printing system as claimed in claim 1, wherein the network device acquires the device information of the printing devices via the network and stores the device information in the device information storage section.

3. The network printing system as claimed in claim 1, further comprising a client device that registers a document definition file in the network device via the network and transmits the print-request data to the network device via the network.

4. The network printing system as claimed in claim 1, wherein the format converting section calculates a print position of each item defined in the document definition file with reference to the actual print area.

5. A network printing device for conducting printing with a specified printing device among a plurality of printing devices connected to a network, the network printing device comprising:

a data receiving section that receives a print request from another device on the network, the print request including a name of a specified document definition file, a name of the specified printing device, and print-request data;

a device information storage section for storing device information representing printing device specifications for the plurality of printing devices, the device information containing a size and margins;

a document definition file storage section for storing one or more document definition files, including the specified document definition file, each document definition file representing a layout of one or more documents, each document definition file including a length and a plurality of position indications for placing respective text portions, and a format converting section for determining an actual print area according to a size and margins and converting the print-request data into a print format for the printing device specified in the received print request based on a ratio between the length in the specified document definition file and a length in device information corresponding to the printing device specified in the received print request, wherein the print-request data includes text portions for each respective position indication in the plurality of position indications in the specified document definition file, the format converting section inserts the text portions into positions in print data sent to the specified printing device according to the respective position indications in the specified document definition file, the specified document definition file is stored in the document definition file storage section in advance of transmission of the text portions in the print-request data, and the network printing device determines whether the specified printing device is available, and if the network printing device determines that the specified printing device is unavailable, the format converting section corrects each element in the print data so that the print data is reformatted for an alternative printing device based on device information for the alternative printing device.

6. The network printing device as claimed in claim 5, wherein the network printing device acquires the device information of the printing devices via the network and stores the device information in the device information storage section.

7. The network printing device as claimed in claim 5, wherein the network printing device is connected to a client device that registers a document definition file via the network and transmits the print-request data via the network.

8. The network printing device as claimed in claim 5, wherein the format converting section calculates a print position of each item defined in the document definition file with reference to the actual print area.

9. A network printing method for conducting printing with a specified printing device among a plurality of printing devices connected to a network, the method comprising:

receiving a print request sent from another device on the network, the received print request including a name of a specified document definition file, a name of the specified printing device, and printer-request data;

creating print data by converting the print-request data into a format for the specified printing device; and transmitting the print data to the specified printing device via the network, wherein the creating of the print data comprises:

retrieving device information of the specified printing device from a device information storage section for storing device information representing printing device specifications for the plurality of printing devices, the device information containing a size and margins;

retrieving the specified document definition file from a document definition file storage section for storing one or more document definition files representing a layout of one or more documents, each document definition file including a length and a plurality of position indications for placing respective text portions;

determining an actual print area according to a size and margins specified in the print-request data; and converting the print-request data into a print format for the specified printing device based on a ratio between the length in the specified document definition file and a length in device information corresponding to the printing device specified in the received print request, wherein the print-request data includes text portions for each respective position indication in the plurality of position indications in the specified document definition file;

the text portions are inserted into positions in the print data sent to the specified printing device according to the respective position indications in the specified document definition file, the specified document definition file is stored in the document definition file storage section in advance of transmission of the text portions in the print-request data, and a determination is made of whether the specified printing device is available, and if the determination is that the specified printing device is unavailable, each element in the print data is corrected so that the print data is reformatted for an alternative printing device based on device information for the alternative printing device.

10. The network printing method as claimed in claim 9, further comprising:
   acquiring the device information of the printing devices via the network and storing the device information in the device information storage section.

11. The network printing method as claimed in claim 9, further comprising:
   registering the document definition file in the network device from a client device via the network; and
   transmitting the print-request data from the client device via the network.

12. The network printing method as claimed in claim 9, wherein format conversion comprises:
   calculating a print position of each item defined in the document definition file with reference to the printable area.

13. The network printing system as claimed in claim 1, wherein:
   the network device further comprises a document definition file managing section that manages the document definition files stored in the document definition file storage section,
   the format converting section sends a query to the document definition file managing section with the name of the specified document definition, and
   the document definition file managing section searches the document definition file storage area for the specified document definition file.

\* \* \* \* \*